United States Patent
Chen et al.

(10) Patent No.: US 11,210,810 B2
(45) Date of Patent: Dec. 28, 2021

(54) CAMERA LOCALIZATION METHOD AND APPARATUS, TERMINAL, AND STORAGE MEDIUM

(71) Applicant: Tencent Technology (Shenzhen) Company Limited, Shenzhen (CN)

(72) Inventors: Chao Chen, Shenzhen (CN); Wei Wu, Shenzhen (CN)

(73) Assignee: Tencent Technology (Shenzhen) Company Limited, Guangdong (CN)

(*) Notice: Subject to any disclaimer, the term of this patent is extended or adjusted under 35 U.S.C. 154(b) by 0 days.

(21) Appl. No.: 16/928,427

(22) Filed: Jul. 14, 2020

(65) Prior Publication Data

US 2020/0342626 A1 Oct. 29, 2020

Related U.S. Application Data

(63) Continuation of application No. PCT/CN2019/085746, filed on May 7, 2019.

(30) Foreign Application Priority Data

Jun. 19, 2018 (CN) .......................... 201810630115.7

(51) Int. Cl.
*G06T 7/73* (2017.01)
*G06T 7/55* (2017.01)
(Continued)

(52) U.S. Cl.
CPC .............. *G06T 7/74* (2017.01); *G01P 15/18* (2013.01); *G01S 19/01* (2013.01); *G06T 7/13* (2017.01);
(Continued)

(58) Field of Classification Search
CPC ........ G01P 15/18; G01S 19/01; G01S 19/485; G06T 2207/10028; G06T 2207/30244;
(Continued)

(56) References Cited

U.S. PATENT DOCUMENTS 9,256,796 B2* 2/2016 Yoshigahara .......... G06K 9/228
2015/0084951 A1* 3/2015 Boivin .................... G06F 3/017
345/419

(Continued)

FOREIGN PATENT DOCUMENTS

CN 103279952 A 9/2013
CN 103646391 A 3/2014
(Continued)

OTHER PUBLICATIONS

International Search Report and Written Opinion for International Patent Application No. PCT/CN2019/085746 dated Aug. 7, 2019; 10 pages.

(Continued)

*Primary Examiner* — James T Boylan
(74) *Attorney, Agent, or Firm* — Crowell & Moring LLP

(57) ABSTRACT

A camera localization method includes: obtaining an environment map of a target environment, predicting a location of a camera when shooting a target image according to location information of the camera when shooting a history image before the target image is shot to obtain predicted location information of the camera; filtering out at least one feature point that is currently not observable by the camera in the environment map according to the predicted location information of the camera, location information of each feature point and viewing-angle area information of each feature point in the environment map; and matching the feature point in the target image with remaining feature points in the environment map after the filtering to obtain a feature point correspondence, and determining location information of the camera according to the feature point correspondence.

16 Claims, 7 Drawing Sheets

(51) Int. Cl.
*G06T 7/246* (2017.01)
*G06T 7/13* (2017.01)
*G01P 15/18* (2013.01)
*G01S 19/01* (2010.01)

(52) U.S. Cl.
CPC ............. *G06T 7/246* (2017.01); *G06T 7/55* (2017.01); *G06T 2207/10028* (2013.01); *G06T 2207/30244* (2013.01)

(58) Field of Classification Search
CPC .. G06T 7/13; G06T 7/246; G06T 7/55; G06T 7/73; G06T 7/74
See application file for complete search history.

(56) References Cited

U.S. PATENT DOCUMENTS

| | | |
|---|---|---|
| 2016/0012588 A1 | 1/2016 | Taguchi et al. |
| 2016/0379092 A1* | 12/2016 | Kutliroff ............ G01C 21/3833 382/158 |
| 2020/0327694 A1* | 10/2020 | Lin ........................ G06T 7/246 |
| 2021/0150755 A1* | 5/2021 | Gao ........................ G06T 7/579 |
| 2021/0160474 A1* | 5/2021 | Kim ...................... G06T 3/4092 |

FOREIGN PATENT DOCUMENTS

| | | |
|---|---|---|
| CN | 105469405 A | 4/2016 |
| CN | 106383123 A | 2/2017 |
| CN | 107990899 A | 5/2018 |

OTHER PUBLICATIONS

Extended European Search Report for European Application No. 19822963.5 dated Jul. 14, 2021; 9 pages.
Pablo F. Alcantarilla et al., "Learning visibility of landmarks for vision-based localization", 2010 IEEE International Conference on Robotics and Automation ICRA 2010; Anchorage, Alaska, May 3-8, 2010, IEEE, Piscataway, NJ, May 3, 2010, pp. 4881-4888, XP031743318, ISBN: 978-1-4244-5038-1.
Andrew J. Davison et al., "MonoSLAM: Real-Time Single Camera SLAM", IEEE Transactions on Patterns Analysis and Machine Intelligence, IEEE Computer Society, vol. 29, No. 6, Jun. 1, 2007, pp. 1052-1067, XP011179664, ISSN: 0162-8828, DOI: 10.1109/TPAMI.2007.1049.
Pradalier C. et al., "Localization space": a framework for localization and planning, for systems using a sensor/landmarks module, Proceedings/2002 IEEE International Conference on Robotics and Automation: May 11-15, 2002, Washington, D.C., IEEE Service Center, Piscataway, NJ, vol. 1, May 11, 2002, p. 708, XP032882422, DOI: 10.1109/Robot.2002.1013441, ISBN: 978-0-7803-7272-6.
Office Action with English Translation of Concise Explanation of Relevance for Chinese Patent Application No. 201810630115.7 dated Oct. 9, 2021, 10 pages.

* cited by examiner

CAMERA LOCALIZATION METHOD AND APPARATUS, TERMINAL, AND STORAGE MEDIUM

RELATED APPLICATION

This application is a continuation application of the International PCT Application No. PCT/CN2019/085746, filed with the National Intellectual Property Administration, PRC on May 7, 2019 which claims priority to Chinese Patent Application No. 201810630115.7, entitled "CAMERA LOCALIZATION METHOD AND APPARATUS, TERMINAL, AND STORAGE MEDIUM" and filed with the National Intellectual Property Administration, PRC on Jun. 19, 2018, which are incorporated herein by reference in their entireties.

FIELD OF THE TECHNOLOGY

Embodiments of the present disclosure relate to the field of computer technologies, and in particular, to a method and apparatus, a terminal, and a storage medium for camera localization.

BACKGROUND OF THE DISCLOSURE

In a visual simultaneous localization and mapping (SLAM) technology, a target environment is observed by a camera to implement environment map building and camera localization. This technology has become a hot research direction in the field of computer vision at present.

The visual SLAM technology includes a map building phase and a localization phase. In the map building phase, first, the camera shoots a plurality of images of the target environment, performs feature extraction on each image to obtain feature points in each image, matches the feature points in the images, and determines location information of each image and location information of each feature point in each image according to a location change between feature points that match each other, so as to build an environment map, the environment map including the location information of each feature point. In the subsequent localization phase, when being located at a specific place in the target environment, the camera may shoot and obtain a target image for the target environment, perform feature extraction on the target image to obtain feature points in the target image, match the feature points in the target image with feature points in the environment map, and obtain location information of the camera according to location information of matching feature points, so as to implement camera localization.

To build a complete and comprehensive environment map, when shooting the plurality of images of the target environment in the map building phase, each location in the target environment may be photographed from a plurality of different angles to obtain a plurality of images from a plurality of viewing angles, so as to build an environment map including feature points from a plurality of viewing angles. Next, in the localization phase, the feature points in the target image are matched with the feature points from a plurality of viewing angles in the environment map to obtain location information of the camera.

However, the camera photographs the target environment only from one viewing angle in practice, so feature points that are only observable from another viewing angle and are not observable from the current viewing angle are invalid for the camera since these feature points are not captured by the camera. Therefore, the manner of matching the feature points in the target image with the feature points from a plurality of viewing angles in the environment map does not match the actual shooting condition of the camera, and the calculation work to match these invalid feature points are wasted, resulting in a large amount of invalid calculation and increasing the possibility of a mismatch.

SUMMARY

Embodiments of this application provide a camera localization method and apparatus, a terminal, and a storage medium.

A camera localization method is performed by a terminal, and includes:

obtaining an environment map of a target environment, the environment map including location information of a plurality of feature points and viewing-angle area information of the plurality of feature points in the target environment, the viewing-angle area information of the feature point being used for representing a viewing-angle area in which the feature point is observable in the target environment;

predicting a location of a camera when shooting a target image according to location information of the camera when shooting a history image which is shot before the target image to obtain predicted location information of the camera;

filtering out a feature point that is currently not observable by the camera in the environment map according to the location information of each feature point and the viewing-angle area information of each feature point in the environment map and the predicted location information of the camera; and matching the feature point in the target image with remaining feature points in the environment map after the filtering to obtain a feature point correspondence, and determining location information of the camera according to the feature point correspondence, the feature point correspondence including a correspondence between the feature point in the target image and a matching feature point in the environment map.

A camera localization apparatus includes:

a map obtaining module, configured to obtain an environment map of a target environment, the environment map including location information of a plurality of feature points and viewing-angle area information of the plurality of feature points in the target environment, the viewing-angle area information of the feature point being used for representing a viewing-angle area in which the feature point is observable in the target environment;

a location prediction module, configured to predict a location of a camera when shooting a target image according to location information of the camera when shooting a history image before the target image is shot to obtain predicted location information of the camera;

a filter module, configured to filter out a feature point that is currently not observable by the camera in the environment map according to the location information of each feature point and the viewing-angle area information of each feature point in the environment map and the predicted location information of the camera; and a localization module, configured to: match the feature point in the target image with remaining feature points in the environment map after the filtering to obtain a feature point correspondence, and determine location information of the camera according to the feature point correspondence, the feature point correspondence including a correspondence between the feature point in the target image and a matching feature point.

A terminal includes a processor and a memory, the memory storing computer-readable instructions, the computer-readable instructions, when being executed by the processor, causing the processor to perform the following steps:

obtaining an environment map of a target environment, the environment map including location information of a plurality of feature points and viewing-angle area information of the plurality of feature points in the target environment, the viewing-angle area information of the feature point being used for representing a viewing-angle area in which the feature point is observable in the target environment;

predicting a location of a camera when shooting a target image according to location information of the camera when shooting a history image before the target image is shot to obtain predicted location information of the camera;

filtering out a feature point that is currently not observable by the camera in the environment map according to the location information of each feature point and the viewing-angle area information of each feature point in the environment map and the predicted location information of the camera; and matching the feature point in the target image with remaining feature points in the environment map after the filtering to obtain a feature point correspondence, and determining location information of the camera according to the feature point correspondence, the feature point correspondence including a correspondence between the feature point in the target image and a matching feature point.

A non-volatile computer-readable storage medium stores computer-readable instructions, the computer-readable instructions, when being executed by one or more processors, causing the one or more processors to perform the following steps:

obtaining an environment map of a target environment, the environment map including location information of a plurality of feature points and viewing-angle area information of the plurality of feature points in the target environment, the viewing-angle area information of the feature point being used for representing a viewing-angle area in which the feature point is observable in the target environment;

predicting a location of a camera when shooting a target image according to location information of the camera when shooting a history image before the target image is shot to obtain predicted location information of the camera;

filtering out a feature point that is currently not observable by the camera in the environment map according to the location information of each feature point and the viewing-angle area information of each feature point in the environment map and the predicted location information of the camera; and matching the feature point in the target image with remaining feature points in the environment map after the filtering to obtain a feature point correspondence, and determining location information of the camera according to the feature point correspondence, the feature point correspondence including a correspondence between the feature point in the target image and a matching feature point.

Details of one or more embodiments of this application are provided in the accompany drawings and description below. Other features, objectives, and advantages of this application become obvious from the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from the accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

A feature-based map building and camera localization method is provided in a conventional solution and there are two phases in the solution. In the first phase which is referred to as a map building phase, an environment map is built by matching feature points in images with each other. In the second phase which is referred to as a localization phase, a camera shoots a current image, and the camera is localized by matching feature points in the current image with feature points in the environment map built in the first phase.

In actual practice, for the same object or the same scene, different pictures may be observed from different viewing angles, and different feature points are extracted from different pictures corresponding to different viewing angles.

Therefore, to ensure the usability of an environment map, for the same target environment, it is often necessary to build an environment map including a plurality of viewing angles. For example, to build an environment map of a corridor, the camera needs to move in two opposite directions, that is, the corridor is observed from two different viewing angles, so as to ensure that the built environment map may include feature points of the corridor observed from two different viewing angles. If the corridor is observed from one direction only, in the subsequent camera localization, when the camera moves in another direction, since observed feature points are different, it is very difficult to implement camera localization based on the previously built environment map, and further leads to a localization failure.

Figure 1:
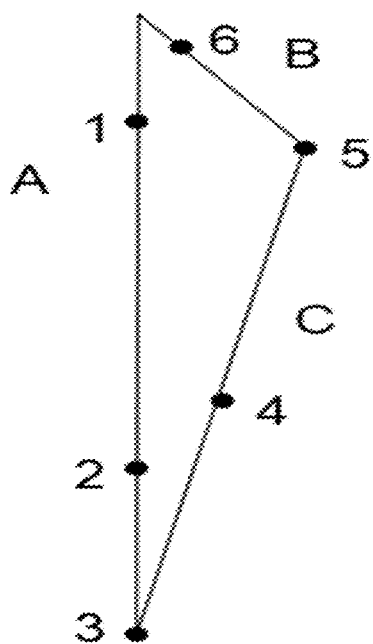
FIG. 1 is a schematic diagram of an exemplary feature points according to an embodiment of this application.

As shown in FIG. 1, if the camera observes a triangular object from the left side, an area A, for example, a feature point 1, a feature point 2, and a feature point 3, may be seen. If the camera observes the triangular object from the right side, an area B and an area C, for example, the feature point 3, a feature point 4, a feature point 5, and a feature point 6, may be seen. If an environment map is built according to the triangular object observed from the left side only, as a result, the environment map includes the feature point 1, the feature point 2, and the feature point 3 only but does not include the feature point 4, the feature point 5, and the feature point 6, and the camera cannot be localized when being located on the right side of the triangular object.

Although a multi-viewing-angle environment map may be built by photographing the target environment by the camera at different locations and viewing angles to ensure the comprehensive usability of the environment map, a problem is caused at the same time: during localization of the camera, in a certain location, the camera actually only shoots the target environment from one viewing angle, and a plurality of feature points cannot be shot by the camera from the current viewing angle, so that the plurality of feature points are invalid for the camera. In this case, if feature points in a target image shot by the camera are matched with all feature points in the environment map, a large amount of calculation on these invalid points is introduced, and the probability of a false match is increased.

Figure 2:
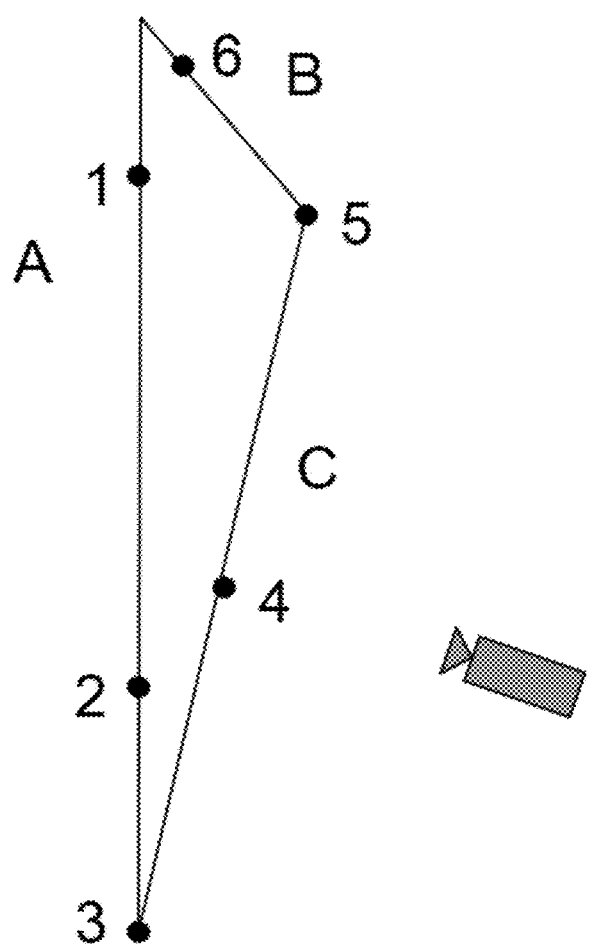
FIG. 2 is a schematic diagram of another exemplary feature points according to an embodiment of this application.

As shown in FIG. 2, when the camera moves to the right side of the triangular object, only the feature point 3, the feature point 4, and the feature point 5 can be observed, and the feature point 1, the feature point 2, and the feature point 6 are also near the camera, so that all the six feature points participate in the matching calculation, increasing the amount of calculation. Moreover, the target image shot by the camera from this particular viewing angle does not include the feature point 1, the feature point 2, and the feature point 6, so that when the target image is matched with the environment map near the triangular object, a matching result may be that the target image and the triangular object do not match, leading to a camera localization error.

To resolve the problem existing in the conventional solution, a camera localization method is provided in the embodiments of this application. By means of the method, location information of each feature point as well as viewing-angle area information of each feature point in an environment map can be determined in a map building phase. The viewing-angle area information is used for representing an area in which a feature point can be observed. The viewing-angle area information may include a collection of spatial points from which the feature point is observable. In a localization phase, an approximate location of a camera is predicted first, a feature point that is currently not observable by the camera is filtered out according to the viewing-angle area information of each feature point, and a feature point in a target image shot by the camera is then matched with remaining feature points in the environment map to determine a location of the camera. In this way, not only the amount of calculation is reduced, but also the probability of a mismatch is reduced, which also means that the accuracy of localization is improved because the remaining feature point used for matching meets the actual shooting condition such as the viewing angle of the camera.

It is to be understood that, the "camera" mentioned in this application is an apparatus or a device having an image capture function, which is configured to shoot an image. The "camera" may be an image capture device specially configured to capture an image; or may be an image capture apparatus configured in a terminal. The image capture apparatus may be specifically a camera. There is no limitation in this application.

The embodiments of this application may be applied to a plurality of scenarios for positioning a terminal equipped with a camera. For example, in a scenario of delivering an article, a user issues an item delivery task to a delivery robot by using a client or a server. The item delivery task includes a loading place and a delivery place of the item. After receiving the item delivery task, the delivery robot may first be localized by using the method provided in the embodiments of this application, and a route is then planned according to the loading place and the delivery place of the item and a current location. A route from the current location to the loading place is first planned, and a route from the loading place to the delivery place is then planned. Subsequently, the delivery robot moves according to the planned route. During the process of movement, the delivery robot is localized in real time to control the movement speed and the movement direction, so as to ensure that the delivery robot moves along the planned route and is prevented from deviating from the route.

For another example, in a scenario of a virtual reality game, an environment map may be built. The environment map not only includes a map of a real scene but also includes virtual elements such as virtual pets or virtual coupons added at some locations in the real scene. During a process of moving, the terminal may be localized by using the method provided in the embodiments of this application. A current location of the terminal and virtual elements arranged near the terminal are determined, and a real scene image shot in real time and the virtual elements arranged nearby are displayed on a display interface of the terminal, so as to constitute a display interface combining virtual and real scene.

Certainly, the embodiments of this application may be alternatively applied to other scenarios. Details are not provided herein.

Figure 3A:
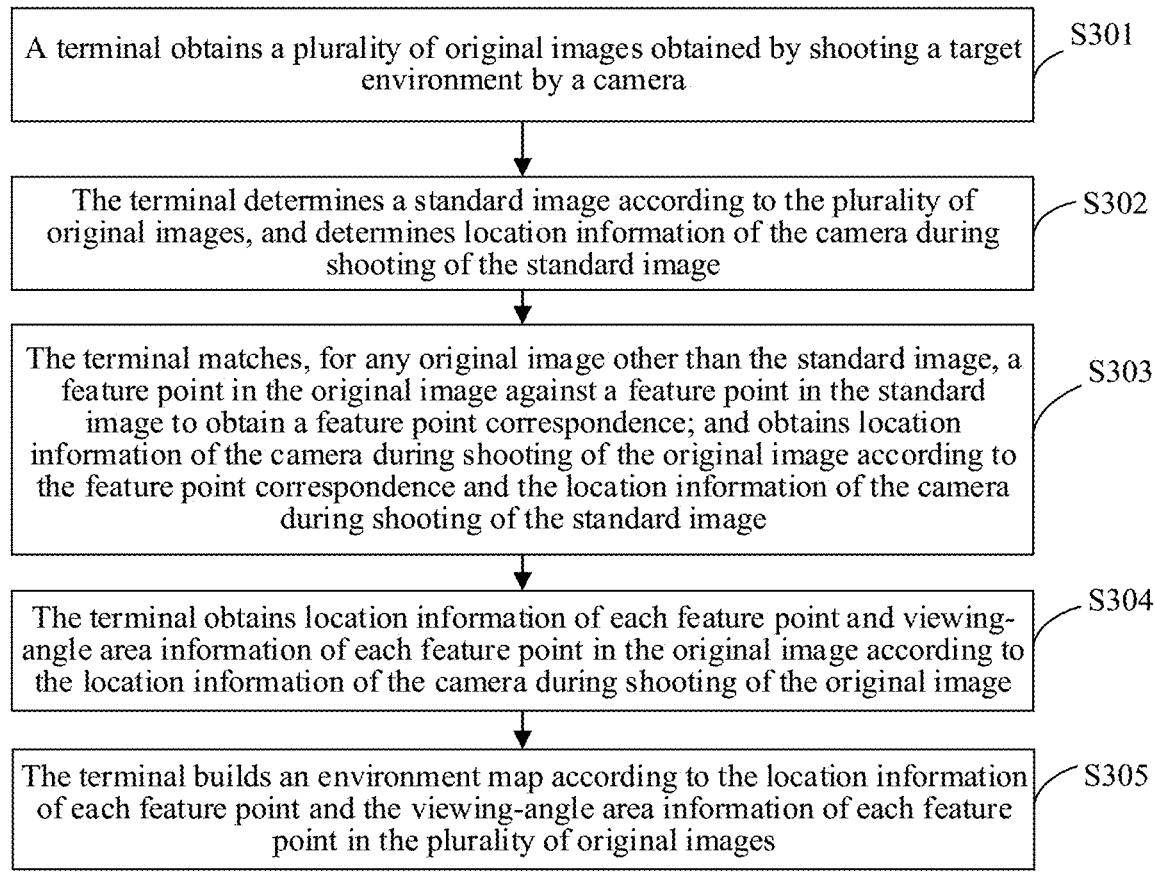
FIG. 3A is a flowchart of an environment map building method according to an embodiment of this application.
Figure 4:
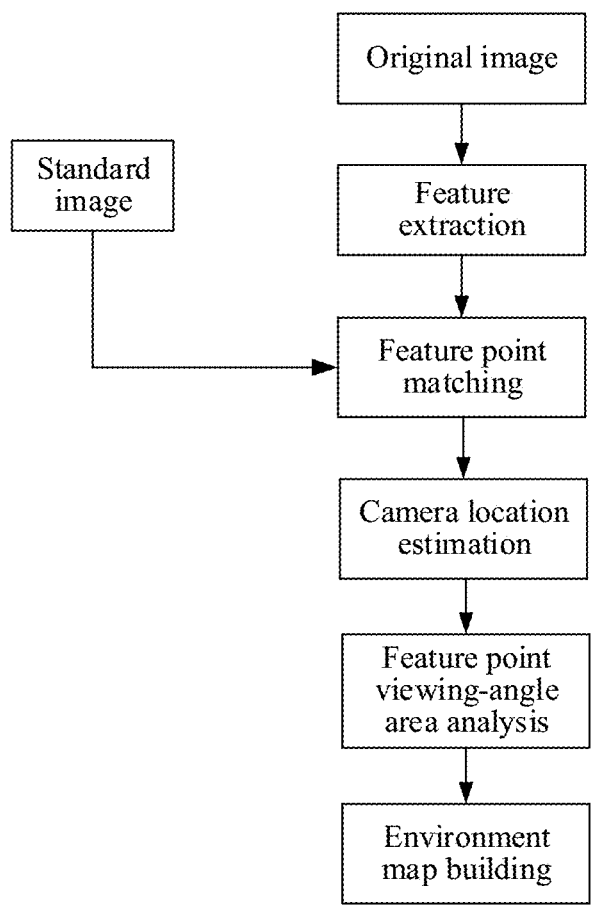
FIG. 4 is an operating flowchart of building an environment map according to an embodiment of this application.

FIG. 3A is a flowchart of an environment map building method according to an embodiment of this application. FIG. 4 is an operating flowchart of building an environment map according to an embodiment of this application. An example in which the environment map building method is performed by a terminal is used to describe the process of building an environment map. Referring to FIG. 3A and FIG. 4, the method includes the following steps.

S301. A terminal obtains a plurality of original images obtained by photographing a target environment a target environment by a camera.

The terminal may be a mobile phone, a tablet computer, a robot, a smart camera or the like. The terminal is equipped with a camera, which may be used to shoot a current environment. The target environment may be a park, a building, a warehouse in which articles are stored, among others. When an environment map of the target environment needs to be built, the terminal may move in the target environment and obtain a plurality of original images by photographing the target environment by the camera.

A quantity of the plurality of original images may be determined according to a precision requirement of the environment map. For example, higher precision requirement needs more original image to be taken. For the same location in the target environment, the location may be shot from a plurality of different viewing angles to obtain multi-viewing-angle original images.

S302. The terminal determines a standard image according to the plurality of original images, and determines location information of the camera when shooting the standard image.

The terminal may determine the standard image and the location information of the camera when shooting the standard image. In a subsequent process, the terminal determines location information of the camera when shooting another original image according to a location difference between this original image and the standard image by using the standard image as a reference.

In a possible implementation, the terminal may determine the first original image shot by the camera as the standard image, and initialize location information of the camera when shooting the standard image. For example, a location of the terminal when shooting the standard image may be used as an origin location, and an environment coordinate system may be created by setting the location information of the standard image as (0, 0, 0). Location information of each original image shot afterwards may be determined according to a location difference between the original image and the standard image. Moreover, considering that with continuous movement of the camera, there are fewer and fewer similarities between the subsequent original images and the standard image, a subsequent original image may be selected as an updated standard image to update location information of the camera when shooting the updated standard image. Location information of each original image shot afterwards may be determined according to a location difference between the original image and the updated standard image.

S303. The terminal matches, for any original image other than the standard image, a feature point in the original image with a feature point in the standard image to obtain a feature point correspondence; and obtains location information of the camera when shooting the original image according to the feature point correspondence and the location information of the camera when shooting the standard image.

After obtaining the plurality of original images, the terminal may perform feature extraction on each original image and determine location information of a feature point in each original image, further determine a descriptor of each feature point. The descriptor is used to describe the feature point. For example, the terminal may extract a feature point by using an algorithm such as FAST (features from accelerated segment test) algorithm, Harris algorithm (a corner detection algorithm), SURF (speed up robust feature) algorithm, BRISK (binary robust invariant scalable keypoints) algorithm, and ORB algorithm (a feature point detection algorithm).

Therefore, with the standard image as a reference, for any original image other than the standard image, a feature point in the original image may be matched with the feature points in the standard image, and a feature point correspondence is established according to each feature point in the original image and a matching feature point in the standard image. That is, the feature point correspondence includes a correspondence between the feature point in the original image and a matching feature point in the standard image, which is equivalent to that feature point pairs between the original image and the standard image are generated.

During matching of feature points, distance measurement criterion may be used. For example, each feature point in the original image may be paired with each feature point in the standard image, and a distance between descriptors of the two feature points in each pair is calculated. For each feature point in the original image, a feature point closest to the feature point in the standard image is selected as a matching feature point of the feature point. Alternatively, a feature point in the standard image that is closest to the feature point in the original image and the distance is less than a preset threshold is selected as the matching feature point, so as to establish a correspondence between the feature point in the original image and a matching feature point in the standard image.

Subsequently, location change information of the original image relative to the standard image may be determined according to the feature point correspondence and the location information of each feature point, and iterative calculation is performed according to the location information of the standard image and the location change information of the original image relative to the standard image to obtain location information of the camera when shooting the original image.

For example, an image 1 is determined as the standard image, and its location information is (x1, y1, z1). It may then be determined according to a feature point correspondence between an image 2 and the image 1 that location change information of the image 2 relative to the image 1 is ($\Delta$x1, $\Delta$y1, $\Delta$z1), similarly it may be determined according to a feature point correspondence between an image 3 and the image 1 that location change information of the image 3 relative to the image 1 is ($\Delta$x2, $\Delta$y2, $\Delta$z2), so that location information (x2, y2, z2) of the image 2 is determined as (x1+$\Delta$x1, y1+$\Delta$y1, z1+$\Delta$z1), and location information (x3, y3, z3) of the image 3 is determined as (x1+$\Delta$x2, y1+$\Delta$y2, z1+$\Delta$z2). In this case, optionally, the image 3 may be updated as the standard image. It is then determined according to a feature point correspondence between an image 4 and the image 3 that location change information of the image 4 relative to the image 3 is ($\Delta$x3, $\Delta$y3, $\Delta$z3), so that location information of the image 4 is (x3+$\Delta$x3, y3+$\Delta$y3, z3+$\Delta$z3).

In a possible implementation, location information of the camera when shooting any image may be represented in the form of a rotation and translation matrix, and the terminal may obtain a rotation and translation matrix of the standard image, and determine a rotation and translation matrix of the original image relative to the standard image according to the feature point correspondence and the location information of each feature point. The rotation and translation matrix includes a rotation parameter and a displacement parameter of the original image relative to the standard image. A rotation and translation matrix of the original image may be obtained by performing iterative calculation on the rotation and translation matrix of the standard image and the rotation and translation matrix of the original image relative to the standard image. The displacement parameter in the rotation and translation matrix is the location information of the camera when shooting the original image.

In another possible implementation, after obtaining the location information of the camera when shooting the original image, the terminal may further remove a noise feature point such as a feature point of a dynamic object present in the original image or a feature point that cannot be matched from the original image.

For example, when shooting the original image, the camera not only shoots the target environment, but may also shoot a dynamic object in the target environment. Therefore, to build the environment map of the target environment accurately, the terminal may analyze a plurality of original images obtained through shooting to obtain location change information between any two original images. If actual location change information of a feature point in the any two original images does not match the location change information of the any two original images, it indicates that during shooting the any two original images by the camera, an object at which a feature point is located has moved in the target environment. Therefore, the feature point may be determined as a feature point of a dynamic object rather than a feature point of the target environment. In this case, the feature point is filtered out.

Alternatively, if a feature point appears in one original image but does not appear in other original images, it indicates that the feature point cannot be matched, the location change of the camera may not be predicted according to the feature point in only one original image, and the camera may not be localized. Therefore, the feature point is filtered out.

S304. The terminal obtains location information of each feature point and viewing-angle area information of each feature point in the original image according to the location information of the camera when shooting the original image.

Figure 3B:
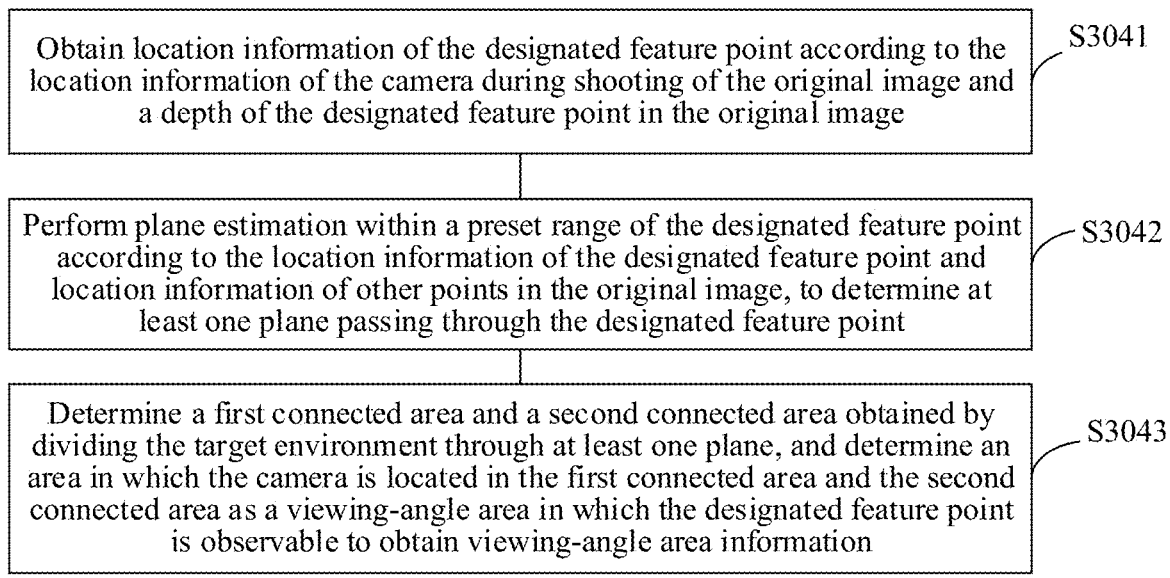
FIG. 3B is a flowchart of steps of obtaining, for any designated feature point in an original image, location information and viewing-angle area information of the designated feature point according to an embodiment of this application.

Referring to FIG. 3B, a process of obtaining, for any designated feature point in the original image, location information and viewing-angle area information of the designated feature point may include the following steps S3041 and S3042:

S3041. Obtain location information of the designated feature point according to the location information of the camera when shooting the original image and a depth of the designated feature point in the original image.

The depth of the designated feature point in the original image is used for representing a distance between the camera when shooting the original image and the designated feature point, and may be used for indicating a relative location relationship between the designated feature point and the camera. After the location information of the camera when shooting the original image is determined, location information of the designated feature point may be obtained according to the location information of the camera and the depth of the designated feature point in the original image.

S3042. Perform plane estimation within a preset range of the designated feature point according to the location information of the designated feature point and location information of other points in the original image, to determine at least one plane passing through the designated feature point.

In an actual environment, a complete object is formed by one or more surfaces, and the location of the surface affects the observable area of each feature point on the surface of the object. Therefore, when analyzing the observable area of the designated feature point, the terminal performs plane estimation within the preset range of the designated feature point by comprehensively considering the location information of the designated feature point and the location information of other points in the original image, to determine at least one plane passing through the designated feature point.

In this case, it is considered that the at least one plane is at least one surface of an object at which the feature point is located, and a viewing-angle area from which the designated feature point is observable is determined according to the location of the at least one plane.

The preset range may be determined in the original image according to the location of the designated feature point. For example, the preset range may be a circular range with the designated feature point as the center and with a specific distance as a radius, or may be a range formed by a plurality of sector-shaped areas selected with the designated feature point as a vertex.

During plane estimation, an edge line segmentation algorithm of a grayscale image or an edge line segmentation algorithm of a depth image may be adopted to predict a plane parameter of at least one plane.

In a possible implementation, the terminal may select at least three feature points within the preset range of the designated feature point, the designated feature point being located inside a polygon formed by the at least three feature points in the original image, the at least three feature points being located in the same plane but not located in the same line in the environment map, calculate a distance between the designated feature point and the plane in which the at least three feature points are located, and then determine whether the distance is less than a preset distance. If the distance between the designated feature point and the plane is less than the preset distance, the designated feature point is determined to be located in the plane in which the at least three feature points are located. That is, only one plane passes through the designated feature point.

During selection of a feature point within the preset range, at least three sector-shaped areas with the designated feature point as a vertex may be determined, and a feature point closest to the designated feature point is selected from each sector-shaped area, so that at least three feature points are selected.

Figure 5:
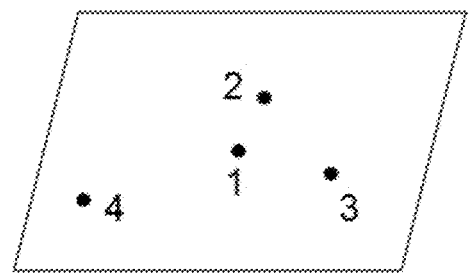
FIG. 5 is a top view of a target environment according to an embodiment of this application.
Figure 6:
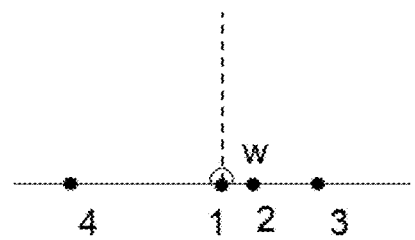
FIG. 6 is a side view of a target environment according to an embodiment of this application.

FIG. 5 is a top view of a target environment according to an embodiment of this application, and FIG. 6 is a side view of a target environment according to an embodiment of this application. Referring to FIG. 5 and FIG. 6, the feature point 1 is a feature point on which a viewing-angle analysis is to be performed. Three feature points, namely, the feature point 2, the feature point 3, and the feature point 4 are selected near the feature point 1, and the three feature points are not located in the same straight line. It may be predicted according to the three feature points that, in a plane, a distance between the feature point 1 and the plane is less than the preset distance. Therefore, it may be determined that the feature point 1 is also located in the plane.

If the distance between the designated feature point and the plane is not less than the preset distance, it is determined that the designated feature point is not located in the plane in which the at least three feature points are located. In this case, edge detection is further performed within the preset range to obtain at least one edge line with the designated feature point as a vertex, and at least four feature points within the preset range are obtained. The designated feature point is used as an intersecting point of at least two planes, the at least one edge line is used as an intersecting line of any two planes, and the at least four feature points are used as points in the at least two planes to obtain the at least two planes.

The at least four feature points may include the at least three feature points selected before, and may further include at least one feature point selected additionally. It only needs to be ensured that the at least four feature points are not located in the same straight line, and the at least four feature points are not located in the at least one edge line. In this case, at least two planes may be determined according to the designated feature point, the at least four feature points, and the at least one edge line.

Figure 7:
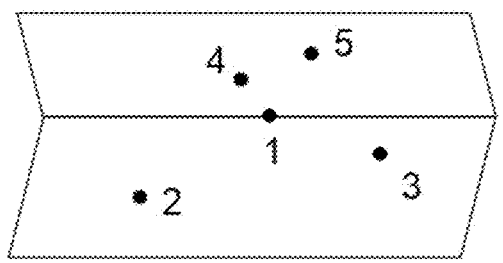
FIG. 7 is a top view of a target environment according to an embodiment of this application.
Figure 8:
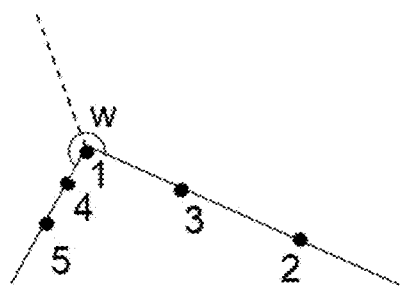
FIG. 8 is a side view of a target environment according to an embodiment of this application.

FIG. 7 is a top view of a target environment according to an embodiment of this application, and FIG. 8 is a side view of a target environment according to an embodiment of this application. Referring to FIG. 7 and FIG. 8, the feature point 2, the feature point 3, and the feature point 4 are located in the same plane. The distance between the feature point 1 and the plane is more than the preset distance. Therefore, it may be determined that the feature point 1 is not located in the plane. In this case, a feature point 5 near the feature point 1 is further selected, and edge detection is performed to obtain an edge line passing through the feature point 1. Two planes may then be determined according to locations of the five feature points and the edge line obtained through detection. The feature point 1, the feature point 2, and the feature point 3 are located in one plane, and the feature point 1, the feature point 4, and the feature point 5 are located in another plane.

In another possible implementation, if the camera with which the terminal is equipped is a depth camera, the depth camera may obtain a depth of each point in an image when shooting the image. For the designated feature point, the depth camera obtains depths of a plurality of points within the preset range of the designated feature point in the original image, then further determine accurate locations of a plurality of feature points in the target environment according to the obtained depth of each point in the original image. Based on the accurate locations of the plurality of feature points, the camera may establish at least one plane, so that the designated feature point is located in each plane of the at least one plane, and the points within the preset range of the designated feature point are located in any one or two planes in the at least one plane. The plurality of points within the preset range may include feature points extracted from the original image as well as points other than the feature points.

S3043. Determine a first connected area and a second connected area obtained by dividing the target environment through the at least one plane, and determine an area in which the camera is located in the first connected area and the second connected area as a viewing-angle area in which the designated feature point is observable to obtain viewing-angle area information.

Any one or more planes intersect in the at least one plane to divide the target environment into two connected areas, which are referred to as the first connected area and the second connected area. For example, one plane may divide the target environment into two connected areas on an upper side and a lower side, two planes may divide the target environment into two connected areas on an inner side of a dihedral angle and an outer side of the dihedral angle, and three planes may also divide the target environment into two connected areas.

After the first connected area and the second connected area are determined, it may be determined according to the location information of the camera when shooting the original image whether the camera is located in the first connected area or the second connected area, so that the area in which the camera is located is determined as a viewing-angle area in which the designated feature point is observable, and information of the area in which the camera is located is used as viewing-angle area information of the designated feature point.

For example, referring to FIG. 6, the feature point 1 is located in a plane, and an observable angle is 180°. If the camera is located in an upper-side area of the plane, the feature point 1 can be observed. If the camera is located in a lower-side area of the plane, the feature point 1 cannot be observed. For another example, referring to FIG. 8, the feature point 1 is located at an intersecting line of two planes, a dashed line represents a center vector of a normal vector of the two planes, and an area in which the feature point 1 is observable is an area with the center vector as the center axis and with w as an angle. If the camera is located in the area, the feature point 1 may be observed, and if the camera is not located in the area, the feature point 1 cannot be observed.

S305. The terminal builds an environment map according to the location information of each feature point and the viewing-angle area information of each feature point in the plurality of original images, the environment map including location information of a plurality of feature points and viewing-angle area information of the plurality of feature points.

After the environment map is built, it may then be used for localization service. The terminal may match the feature points in the target image shot by the camera currently with the feature points in the environment map, and determine a location of the camera according to a matching result to implement camera localization.

In a possible implementation, if the location information and the viewing-angle area information of the feature point are obtained after the analysis of each original image is completed, the terminal may further optimize location information and viewing-angle area information of matching feature points in different images to obtain a globally consistent environment map. For example, if location information of a feature point in an image deviates from location information of matching feature points in a plurality of other images, the location information of the feature point in the image may be corrected, to ensure that location change information of different images is consistent with location change information of the matching feature points in different images.

By means of the method provided in this embodiment of this application, a plurality of original images are obtained by photographing a target environment using an image capturing device such as a camera, location information of each original image is obtained, and location information of each feature point and viewing-angle area information of each feature point are obtained according to the location information of each original image, so that not only a multi-viewing-angle environment map is built, but also an area in which feature points are observable can be represented with the viewing-angle area information. Subsequently, a feature point that is not observable by the camera may be filtered out according to predicted location information of the camera and the viewing-angle area information of the feature point, thereby reducing the amount of calculation and improving the accuracy and efficiency of localization.

Figure 9:
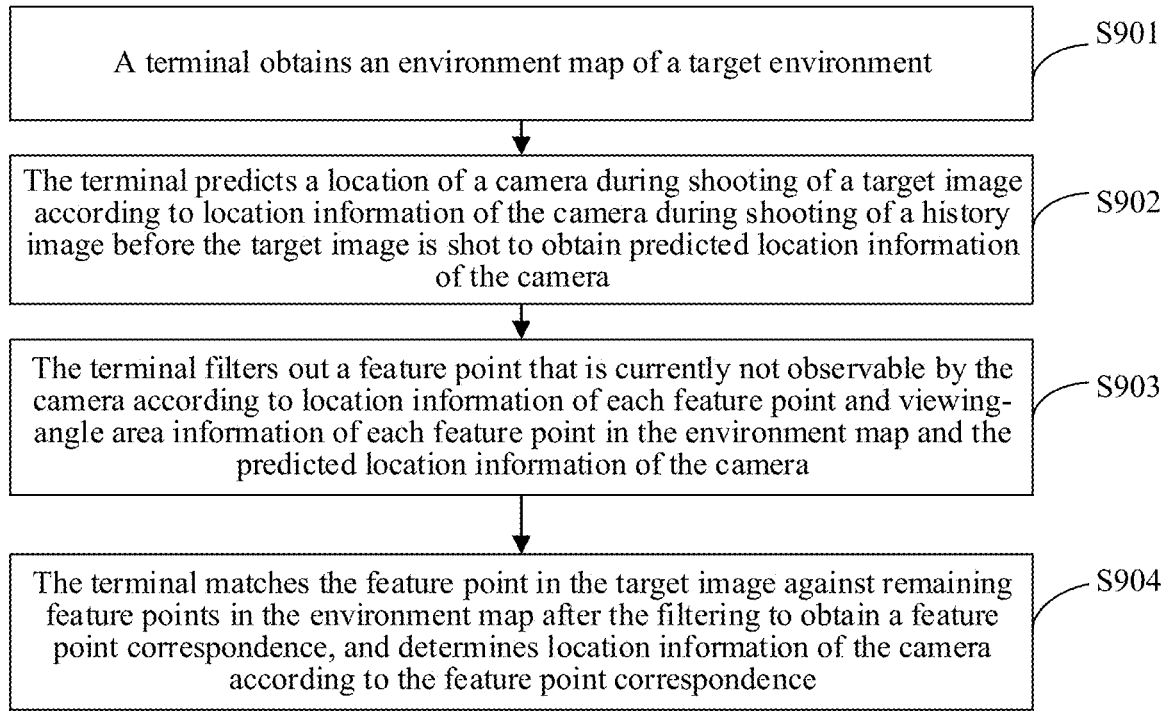
FIG. 9 is a flowchart of a camera localization method according to an embodiment of this application.

FIG. 9 is a flowchart of a camera localization method according to an embodiment of this application. The camera localization method is performed by a terminal. An example is given to describe a process of localizing a camera when the camera moves in a target environment. Referring to FIG. 9, the method includes the following steps:

S901. A terminal obtains an environment map of a target environment.

The environment map includes location information of a plurality of feature points and viewing-angle area information of the plurality of feature points in the target environment, and the viewing-angle area information of the feature point is used for representing a viewing-angle area in which the feature point is observable in the target environment.

For a specific process of building the environment map, reference may be made to the embodiment shown in FIG. 3A, and details are not described again in this embodiment of this application.

S902. The terminal predicts a location of a camera when shooting a target image according to location information of the camera when shooting a history image before the target image is shot to obtain predicted location information of the camera.

In this embodiment of this application, the terminal is equipped with a camera. During a process of moving in the target environment, the terminal may use the camera to photograph the current target environment to obtain one or more images.

The history image is an image shot at a time before the target image is shot. In this embodiment of this application, the location information of the camera when shooting the history image may be specifically location information of the camera when shooting a specific history image (for example, a last image shot by the camera before the target image is shot), or may be comprehensive location information determined according to location information of the camera when shooting a plurality of history images. It is to be understood that, in the solution provided in this embodiment of this application, the location of the camera when shooting the target image needs to be predicted according to the location information of the camera when shooting the history image. Therefore, if the location of the camera is predicted according to location information of the camera when shooting a last image or location information of the camera when shooting first several history images, the accuracy of the prediction is relatively high.

In an embodiment, if currently the terminal is to be localized, an image shot by the camera currently is referred to as a target image. The terminal first predicts a current location of the camera (the terminal) according to the location information of the camera when shooting the last image or previous $n^{th}$ image before the target image is shot to obtain predicted location information of the camera. In this case, the terminal temporarily does not match feature point in the target image with feature points in the environment map. In an embodiment, step S902 may include any one or a combination of step A, step B, and step C.

Step A. Obtain the predicted location information of the camera by using a constant speed model according to location information of the camera when shooting a last image before the target image is shot and a time interval between any two images that are adjacent in time and shot by the camera.

Specifically, the camera may set a fixed time interval, and shoot one image within every fixed time interval to obtain a plurality of images through shooting. The any two images adjacent in time are any two images adjacent in time in the plurality of images shot by the camera, and a time interval between the two images is equal to the fixed time interval set by the camera. Assuming that the camera moves at a constant speed, a constant speed model may be obtained. The constant speed model sets the camera to move at a fixed speed, and the fixed speed may be set by the terminal to a default value, or may be set according to a speed at which a common person walks. Therefore, after obtaining the location information of the camera when shooting the last image, the terminal may obtain a displacement quantity of the camera within the time interval according to the time interval and by using the constant speed model, and obtain predicted location information of the camera according to the location information of the camera when shooting the last image and the displacement quantity.

Step B. Obtain the predicted location information of the camera by using a variable speed model according to location information of the camera when shooting a last image before the target image is shot, a time interval between any two images that are adjacent in time and shot by the camera, and an acceleration detected by a sensor.

The camera may set a fixed shooting interval, and shoot an image based on the shooting interval to obtain a plurality of images through shooting. The any two images adjacent in time are any two images adjacent in time in the plurality of images shot by the camera, and a time interval between the two adjacent images is equal to the fixed shooting interval set by the camera. Assuming that the camera moves at variable speeds, a variable speed model may be obtained. The variable speed model sets the camera to move at a specific acceleration, and a displacement quantity of the camera within the time interval can be calculated according to an inputted initial speed, the acceleration, and the time interval. Therefore, with the movement of the camera, after obtaining the location information of the camera when shooting the last image and the initial speed, the terminal detects an acceleration through the equipped sensor, obtains a displacement quantity of the camera within the shooting interval according to an initial speed of the camera when shooting the last image and the acceleration and by using the variable speed model, and obtains predicted location information of the camera according to the location information of the camera when shooting the last image and the displacement quantity.

Step C. The terminal obtains location change information of the target image relative to a last image by tracking a feature point in the previous image during the time period from shooting the previous image to shooting the target image by the camera, and obtains the predicted location information of the camera according to location information of the camera when shooting the previous image and the location change information of the target image relative to the last image.

If the camera shoots the previous image, the location information of the camera when shooting the previous image may be obtained, and during the time period from shooting the last image to shooting the target image by the camera, the terminal may track a feature point in the previous image, and obtain location change information of the target image relative to the previous image according to movement information of the feature point, and an iterative calculation is performed according to the location information of the camera when shooting the previous image and the location change information of the target image relative to the previous image to obtain the predicted location information of the camera.

During the process of tracking, the terminal may obtain movement information of the feature point by using a motion tracking and estimation algorithm such as the optical flow matching algorithm, and obtain location change information of the target image relative to the last image according to the movement information. For example, the terminal may obtain the movement information of a plurality of feature points by using the optical flow matching algorithm, and determine location information of the plurality of feature points in the last image and location information of the plurality of feature points in the target image according to the movement information, so as to determine a rotation and translation matrix of the target image relative to the last image. A displacement parameter in the rotation and translation matrix is the location change information of the target image relative to the last image. Alternatively, the terminal may track the feature point by using another tracking algorithm.

In addition, when the camera is just started or initialized, the terminal has no last image that may be used as a reference image, or in another scenario, a difference between the target image and the last image shot before is excessively large because the location of the terminal changes excessively, and there is no matching feature point between the two. In these two cases, the predicted location information of the target image may not be obtained according to the location information of the camera when shooting the last image before the target image is shot. At this time, a re-localization is performed, the feature point in the target image is matched with the plurality of feature points in the environment map to select a feature point that best matches the feature point in the target image, and predicted location information of the target image is preliminarily determined according to a location of the selected matching feature point.

During matching of feature points, each feature point in the target image may be paired with each feature point in the environment map according to a distance measurement criterion, and a distance between descriptors of the two feature points in each pair is calculated. A smaller distance indicates a smaller difference between the descriptors of the two feature points, and the two are more likely to be the same feature point. For each feature point in the target image, a feature point that is closest to the feature point in the environment map is selected as a matching feature point of the feature point. Alternatively, a feature point that is closest to the feature point in the environment map and is at a distance less than a preset distance from the feature point is selected as a matching feature point of the feature point, and current predicted location information of the camera may be obtained according to location information of matching feature points corresponding to the plurality of feature points in the target image.

In a possible implementation, the terminal may determine a geographic area at which the camera is located according to geographic information detected by an external sensor, limit matching feature points in a relatively small geographic area, and obtain current predicted location information of the camera by performing the feature point matching in the geographic area at which the camera is located. The external sensor may be a wireless fidelity (Wi-Fi) device, an ultra wideband (UWB) device, a wireless base station or the like that is connected to the terminal. The external sensor has the geographic location information pre-configured according to its geographic location. With the movement of the terminal, when being located near the external sensor, the terminal may be connected to the external sensor, receive geographic location information sent by the external sensor, and determine a current geographic area according to the geographic location information.

In an embodiment, for a specific implementation that the terminal predicts a location of the camera when shooting the target image according to location information of the camera when shooting another history image (for example, the second last image shot by the camera before the target image is shot) to obtain predicted location information of the camera, reference may be made to the specific description of the foregoing step that the terminal predicts a location of the camera when shooting the target image according to the location information of the camera when shooting the last image to obtain predicted location information of the camera, and details are not described herein. S903. The terminal filters out a feature point that is currently not observable by the camera according to the location information of each feature point and the viewing-angle area information of each feature point in the environment map and the predicted location information of the camera.

The viewing-angle area information of the feature point is used for representing a viewing-angle area in which the feature point is observable. If the camera is located in a viewing-angle area of a feature point, the feature point may be observed, and a captured target image may include the feature point. If the camera is not located in a viewing-angle area of a feature point, even if the feature point is not far from the camera, the camera cannot observe the feature point, and a captured target image may not include the feature point.

Therefore, to reduce the amount of calculation, for each feature point in the environment map, the terminal may determine whether the camera is located in a viewing-angle area of a feature point according to the predicted location information of the camera and viewing-angle area information of the feature point. If it is determined that the camera is located in the viewing-angle area of the feature point, the feature point is kept. If it is determined that the camera is not located in a viewing-angle area of a feature point, the feature point is filtered out.

By means of the foregoing methods, a feature point that is currently not observable by the camera in the environment map may be filtered out, and only a feature point that is currently observable by the camera is kept.

S904. The terminal matches the feature point in the target image with remaining feature points in the environment map after the filtering to obtain a feature point correspondence, and obtains location information of the camera according to the feature point correspondence, the feature point correspondence including a correspondence between the feature point in the target image and a matching feature point.

The terminal may obtain a descriptor of each feature point in the target image and a descriptor of each remaining feature point in the environment map after the filtering, pair each feature point in the target image with the remaining feature point in the environment map after the filtering, and calculate a distance between the descriptors of the two feature points in each pair. A smaller distance indicates a smaller difference between the descriptors of the two feature points, and the two are more likely to be the same feature point. For each feature point in the target image, a feature point that is closest to the feature point in the environment map is selected as a matching feature point. Alternatively, a feature point that is closest to the feature point in the environment map and is at a distance less than a preset distance from the feature point is selected as the matching feature point, so as to establish a feature point correspondence.

Next, location information of the camera may be obtained according to the feature point correspondence and the location information of each remaining feature point in the environment map. The location information is used for representing current location information of the camera in the target environment. The location information of the camera may be obtained by using a PnP (Perspective-n-Point) algorithm or another algorithm.

After the location information of the camera is obtained, a location of the camera in the environment map may be determined, and a corresponding operation is performed based on the location. For example, in a scenario of delivering an item, it may be determined whether a delivery robot deviates from a planned route according to a current location of the delivery robot. If the delivery robot deviates from the planned route, the route is planned again according to the current location of the delivery robot and a delivery place. Alternatively, in a scenario of a virtual reality game, after a location of the terminal is determined, a virtual element arranged at the location may be displayed on a display interface of the terminal for a user to interact with the virtual element.

By means of the method provided in the embodiments of this application, an environment map of a target environment is obtained, the environment map including location information of a plurality of feature points and viewing-angle area information of the plurality of feature points, the viewing-angle area information being used for representing a viewing-angle area in which a feature point is observable, a location of a camera when shooting a target image is predicted according to location information of the camera when shooting a last image before the target image is shot to obtain predicted location information of the camera, a feature point that is currently not observable by the camera is filtered out according to the location information of each feature point and the viewing-angle area information of each feature point in the environment map and the predicted location information of the camera, the feature point in the target image is matched with the remaining feature points in the environment map after the filtering to obtain a feature point correspondence, so that location information of the camera is determined, and the camera is localized. In this way, not only the amount of calculation is reduced and the calculation speed is improved, but also a possibility of a mismatch is reduced because the feature point used for matching meets the actual shooting condition of the camera, which is equivalent to that the accuracy of localization and the robustness of the map tracking are improved.

The embodiments of this application provide an SLAM method based on a visual feature viewing-angle area, thereby greatly improving the robustness of localization and map building, and provide reliable information for camera localization. The method may be widely applied to a plurality of scenarios such as robot navigation, game character localization, unmanned aerial vehicle localization, and remotely operated underwater vehicle localization, thereby enhancing the stability and accuracy of a whole system, reducing the amount of calculation, reducing requirements on the hardware configuration, and reducing the costs.

Figure 10:
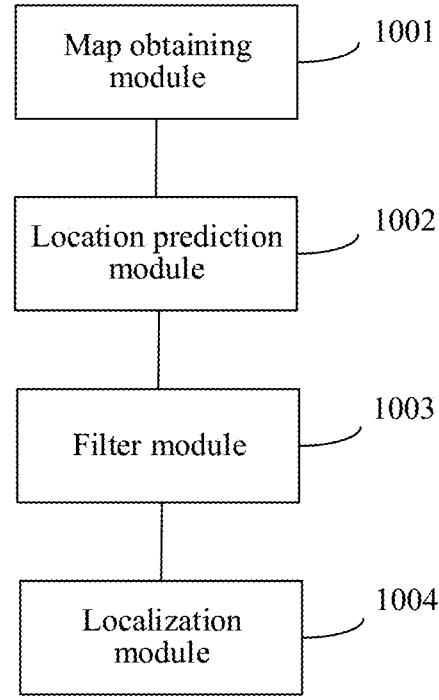
FIG. 10 is a schematic structural diagram of a camera localization apparatus according to an embodiment of this application.

FIG. 10 is a schematic structural diagram of a camera localization apparatus according to an embodiment of this application. Referring to FIG. 10, the apparatus includes:

a map obtaining module 1001, configured to obtain an environment map of a target environment, the environment map including location information of a plurality of feature points and viewing-angle area information of the plurality of feature points in the target environment, the viewing-angle area information of the feature point being used for representing a viewing-angle area in which the feature point is observable in the target environment;

a location prediction module 1002, configured to predict a location of a camera when shooting a target image according to location information of the camera when shooting a history image before the target image is shot to obtain predicted location information of the camera; a filter module 1003, configured to filter out a feature point that is currently not observable by the camera in the environment map according to the location information of each feature point and the viewing-angle area information of each feature point in the environment map and the predicted location information of the camera; and a localization module 1004, configured to: match the feature point in the target image with remaining feature points in the environment map after the filtering to obtain a feature point correspondence, and determine location information of the camera according to the feature point correspondence, the feature point correspondence including a correspondence between the feature point in the target image and a matching feature point.

In an embodiment, the location prediction module 1002 includes:

a first prediction unit, configured to obtain the predicted location information of the camera by using a constant speed model according to location information of the camera when shooting a last image and a time interval between any two images that are adjacent in time and shot by the camera; or a second prediction unit, configured to obtain the predicted location information of the camera by using a variable speed model according to location information of the camera when shooting a last image, a time interval between any two images that are adjacent in time and shot by the camera, and an acceleration detected by a sensor; or a third prediction unit, configured to obtain location change information of the target image relative to a last image by tracking a feature point in the last image during a period from shooting the last image to shooting the target image by the camera, and obtain the predicted location information of the camera according to location information of the camera when shooting the last image and the location change information of the target image relative to the last image.

In an embodiment, the camera localization apparatus further includes:

a re-localization module, configured to match the feature point in the target image with the plurality of feature points in the environment map to obtain the predicted location information of the camera if the camera is just started or initialized, or the predicted location information of the camera fails to be obtained according to the location information of the camera when shooting the history image.

In an embodiment, the filter module 1003 is further configured to filter out, for each feature point in the environment map, the feature point if it is determined according to the predicted location information of the camera that the camera is not located in a viewing-angle area of the feature point.

In an embodiment, the map obtaining module includes:

a standard determination unit, configured to: obtain a plurality of original images obtained by photographing the target environment by the camera, determine a standard image according to the plurality of original images, and determine location information of the camera when shooting the standard image;

a location obtaining unit, configured to: match, for any original image other than the standard image, a feature point in the original image with a feature point in the standard image to obtain a feature point correspondence, the feature point correspondence including a correspondence between the feature point in the original image and a matching feature point in the standard image; and obtain location information of the camera when shooting the original image according to the feature point correspondence and the location information of the camera when shooting the standard image;

an information obtaining unit, configured to obtain location information of each feature point and viewing-angle area information of each feature point in the original image according to the location information of the camera when shooting the original image; and a map building unit, configured to build the environment map according to the location information of each feature point and the viewing-angle area information of each feature point in the plurality of original images.

In an embodiment, the information obtaining unit is further configured to: obtain, for any designated feature point in the original image, location information of the designated feature point according to the location information of the camera when shooting the original image and a depth of the designated feature point in the original image; perform plane estimation within a preset range of the designated feature point according to the location information of the designated feature point and location information of other points in the original image, to determine at least one plane passing through the designated feature point; and determine a first connected area and a second connected area obtained by dividing the target environment through the at least one plane, and determine an area in which the camera is located in the first connected area and the second connected area as a viewing-angle area in which the designated feature point is observable to obtain the viewing-angle area information.

In an embodiment, the information obtaining unit is further configured to:

select at least three feature points within the preset range of the designated feature point, the designated feature point being located inside a polygon formed by the at least three feature points, the at least three feature points being located in the same plane but not located in the same line in the environment map; and determine that the designated feature point is located in the plane in which the at least three feature points are located if a distance between the designated feature point and the plane in which the at least three feature points are located is less than a preset distance.

In an embodiment, the information obtaining unit is further configured to: perform edge detection within the preset range if the distance between the designated feature point and the plane in which the at least three feature points are located is not less than the preset distance to obtain at least one edge line with the designated feature point as a vertex, and obtain at least four feature points within the preset range; and use the designated feature point as an intersecting point of at least two planes, use the at least one edge line as an intersecting line of any two planes, and use the at least four feature points as points in the at least two planes to obtain the at least two planes.

Optionally, the camera is a depth camera, and the information obtaining unit is further configured to: obtain depths of a plurality of points within the preset range of the designated feature point in the original image, and determine the at least one plane according to the depth of each point in the original image, the designated feature point being located in each plane in the at least one plane, the points within the preset range of the designated feature point being located in any one or two planes in the at least one plane.

When the camera localization apparatus provided in the foregoing embodiments implements a camera localization, the division of the foregoing functional modules is merely used as an example for illustration. In practical applications, different functional modules may be allocated to complete the foregoing functions as required, that is, an internal structure of the terminal is divided into different functional modules, so as to complete all or some of the functions described above. In addition, the camera localization apparatus provided in the foregoing embodiments and the embodiments of the camera localization method belong to one concept. For the specific implementation process, reference may be made to the method embodiments, and details are not described herein again.

Figure 11:
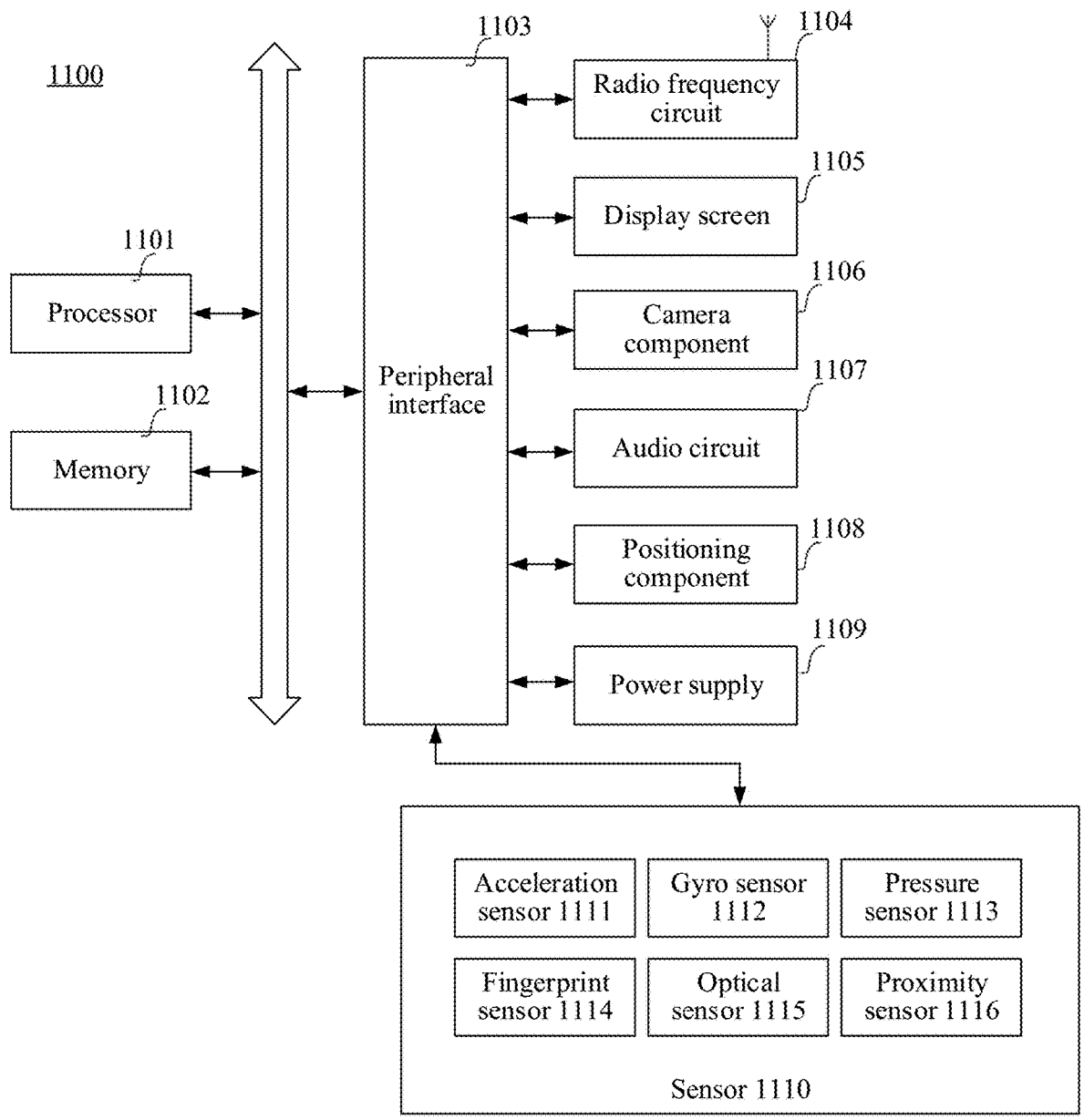
FIG. 11 is a schematic structural diagram of a terminal according to an embodiment of this application.

FIG. 11 is a structural block diagram of a terminal 1100 according to an exemplary embodiment of this application. The terminal 1100 may be a portable mobile terminal, for example: a smartphone, a tablet computer, a moving picture experts group audio layer III (MP3) player, a moving picture experts group audio layer IV (MP4) player, a notebook computer, a desktop computer, a head mounted device, or any another smart terminal. The terminal 1100 may also be referred to as another name such as user equipment, a portable terminal, a laptop terminal, or a desktop terminal.

Generally, the terminal 1100 includes a processor 1101 and a memory 1102.

The processor 1101 may include one or more processing cores, for example, may be a 4-core processor or a 5-core processor. The processor 1101 may be implemented in at least one hardware form of digital signal processing (DSP), a field-programmable gate array (FPGA), and a programmable logic array (PLA). The processor 1101 may alternatively include a main processor and a coprocessor. The main processor is configured to process data in an awake state, also referred to as a central processing unit (CPU), and the coprocessor is a low-power consumption processor configured to process data in an idle state. In some embodiments, the processor 1101 may be integrated with a graphics processing unit (GPU). The GPU is configured to be responsible for rendering and depicting content that a display screen needs to display. In some embodiments, the processor 1101 may further include an artificial intelligence (AI) processor. The AI processor is configured to process a calculation operation related to machine learning.

The memory 1102 may include one or more computer-readable storage media. The computer-readable storage medium may be non-transient. The memory 1102 may further include a high-speed random access memory, and a non-volatile memory such as one or more magnetic disk storage devices and a flash storage device. In some embodiments, the non-transient computer-readable storage medium in the memory 1102 is configured to store at least one instruction, and the at least one instruction is configured to be executed by the processor 1101 to implement the camera localization method provided in the method embodiment of this application.

In some embodiments, the terminal 1100 further optionally includes a peripheral interface 1103 and at least one peripheral. The processor 1101, the memory 1102, and the peripheral interface 1103 may be connected through a bus or a signal cable. Each peripheral may be connected to the peripheral interface 1103 through a bus, a signal cable, or a circuit board. Specifically, the peripheral includes: at least one of a radio frequency (RF) circuit 1104, a touch display screen 1105, a camera component 1106, an audio circuit 1107, a positioning component 1108, and a power supply 1109.

The peripheral interface 1103 may be configured to connect at least one peripheral related to input/output (I/O) to the processor 1101 and the memory 1102. In some embodiments, the processor 1101, the memory 1102, and the peripheral interface 1103 are integrated into the same chip or circuit board. In some other embodiments, any one or two of the processor 1101, the memory 1102, and the peripheral interface 1103 may be implemented on an independent chip or circuit board, and the implementation is not limited in this embodiment.

The RF circuit 1104 is configured to receive and transmit an RF signal, also referred to as an electromagnetic signal. The RF circuit 1104 communicates with a communications network and another communications device by using the electromagnetic signal. The RF circuit 1104 may convert an electric signal into an electromagnetic signal for transmission, or convert a received electromagnetic signal into an electric signal. Optionally, the RF circuit 1104 includes an antenna system, an RF transceiver, one or more amplifiers, a tuner, an oscillator, a digital signal processor, a codec chip set, a subscriber identity module card, and the like. The RF circuit 1104 may communicate with another terminal by using at least one wireless communication protocol. The wireless communication protocol includes, but is not limited to: a metropolitan area network, generations of mobile communication networks (2G, 3G, 4G, and 5G), a wireless local area network and/or a Wi-Fi network. In some embodiments, the RF circuit 1104 may further include a near field communication (NFC) related circuit, and is not limited in this application.

The display screen 1105 is configured to display a user interface (UI). The UI may include a graph, text, an icon, a video, and any combination thereof. If the display screen 1105 is a touch display screen, the display screen 1105 is further capable of acquiring a touch signal on or over a surface of the display screen 1105. The touch signal may be inputted into the processor 1101 as a control signal for processing. In this case, the display screen 1105 may further be configured to provide a virtual button and/or a virtual keyboard, which is also referred to as a soft button and/or a soft keyboard. In some embodiments, there may be one display screen 1105, disposed on a front panel of the terminal 1100. In some other embodiments, there may be two display screens 1105, respectively disposed on different surfaces of the terminal 1100 or designed in a foldable shape. In still some other embodiments, the display screen 1105 may be a flexible display screen, disposed on a curved surface or a folded surface of the terminal 1100. Even, the display screen 1105 may further be set to have a non-rectangular irregular graph, that is, a special-shaped screen. The display screen 1105 may be manufactured by using a material such as a liquid crystal display (LCD), an organic light-emitting diode (OLED), or the like.

The camera component 1106 is configured to shoot an image or a video. Optionally, the camera component 1106 includes a front-facing camera and a rear-facing camera. Generally, the front-facing camera is disposed on a front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 1106 may further include a flash. The flash may be a monochrome temperature flash, or may be a double color temperature flash. The double color temperature flash refers to a combination of a warm flash and a cold flash, and may be configured to perform light ray compensation at different color temperatures.

The audio circuit 1107 may include a microphone and a loudspeaker. The loudspeaker is configured to acquire sound waves of a user and an environment, and convert the sound waves into electric signals and input the electrical signals into the processor 1101 for processing, or input the electrical signals into the RF circuit 1104 to implement speech communication. For the purpose of stereo sound acquisition or noise reduction, there may be a plurality of microphones, respectively disposed at different parts of the terminal 1100. The microphone may further be a microphone array or an omnidirectional microphone. The loudspeaker is configured to convert electric signals from the processor 1101 or the RF circuit 1104 into sound waves. The loudspeaker may be a conventional thin-film loudspeaker or a piezoelectric ceramic loudspeaker. If the loudspeaker is the piezoelectric ceramic loudspeaker, electric signals not only can be converted into sound waves that can be heard by human, but also can be converted into sound waves that cannot be heard by human for ranging and the like. In some embodiments, the audio circuit 1107 may further include an earphone jack.

The positioning component 1108 is configured to locate a current geographic location of the terminal 1100, to implement a navigation or a location based service (LBS). The positioning component 1108 may be a positioning component based on the Global Positioning System (GPS) of the United States, the BeiDou system of China, the GLONASS System of Russia, or the GALILEO System of the European Union.

The power source 1109 is configured to supply power for various components in the terminal 1100. The power supply 1109 may be an alternating current, a direct current, a primary battery, or a rechargeable battery. If the power supply 1109 includes the rechargeable battery, the rechargeable battery may support a wired charging or a wireless charging. The rechargeable battery may further be configured to support a quick charge technology.

In some embodiments, the terminal 1100 further includes one or more sensors 1110. The one or more sensors 1110 include, but are not limited to: an acceleration sensor 1111, a gyro sensor 1112, a pressure sensor 1113, a fingerprint sensor 1114, an optical sensor 1115, and a proximity sensor 1116.

The acceleration sensor 1111 may detect the magnitude of acceleration on three coordinate axes of a coordinate system established with the terminal 1100. For example, the acceleration sensor 1111 may be configured to detect components of gravity acceleration on the three coordinate axes. The processor 1101 may control, according to a gravity acceleration signal acquired by the acceleration sensor 1111, the touch display screen 1105 to display the UI in a frame view or a portrait view. The acceleration sensor 1111 may further be configured to acquire game or user motion data.

The gyro sensor 1112 may detect a body direction and a rotation angle of the terminal 1100. The gyro sensor 1112 may cooperate with the acceleration sensor 1111 to acquire 3D action by the user on the terminal 1100. The processor 1101 may implement the following functions according to the data acquired by the gyro sensor 1112: motion sensing (for example, changing the UI according to a tilt operation of the user), image stabilization during shooting, game control, and inertial navigation.

The pressure sensor 1113 may be disposed at a side frame of the terminal 1100 and/or a lower layer of the touch display screen 1105. When the pressure sensor 1113 is disposed on the side frame of the terminal 1100, a holding signal of the user to the terminal 1100 may be detected, and left/right hand identification and a quick action may be performed by the processor 1101 according to the holding signal acquired by the pressure sensor 1113. When the pressure sensor 1113 is disposed at the lower layer of the touch display screen 1105, the processor 1101 controls an operable control on the UI according to a pressure operation performed by the user on the touch display screen 1105. The operable control includes at least one of a button control, a scroll bar control, an icon control, and a menu control.

The fingerprint sensor 1114 is configured to acquire a user's fingerprint, and the processor 1101 identifies a user's identity according to the fingerprint acquired by the fingerprint sensor 1114, or the fingerprint sensor 1114 identifies a user's identity according to the acquired fingerprint. When the user's identity is identified as a trusted identity, the processor 1101 authorizes the user with relevant sensitive actions, the sensitive actions include unlocking screen, viewing encrypted information, downloading software, payment, changing setting, and the like. The fingerprint sensor 1114 may be disposed on a front face, a back face, or a side face of the terminal 1100. When the terminal 1100 is provided with a physical button or a vendor logo, the fingerprint sensor 1114 may be integrated with the physical button or the vendor logo.

The optical sensor 1115 is configured to acquire ambient light intensity. In an embodiment, the processor 1101 may control display luminance of the touch display screen 1105 according to the ambient light intensity acquired by the optical sensor 1115. Specifically, when the ambient light intensity is relatively high, the display brightness of the touch display screen 1105 is increased. When the ambient light intensity is relatively low, the display brightness of the touch display screen 1105 is decreased. In another embodiment, the processor 1101 may further dynamically adjust a camera parameter of the camera component 1106 according to the ambient light intensity acquired by the optical sensor 1115.

The proximity sensor 1116, also referred to as a distance sensor, is usually disposed on the front panel of the terminal 1100. The proximity sensor 1116 is configured to acquire a distance between the user and the front surface of the terminal 1100. In an embodiment, when the proximity sensor 1116 detects that the distance between the user and the front surface of the terminal 1100 gradually becomes small, the touch display screen 1105 is controlled by the processor 1101 to switch from a bright screen state to an on-screen state. When the proximity sensor 1116 detects that the distance between the user and the front surface of the terminal 1100 gradually becomes large, the touch display screen 1105 is controlled by the processor 1101 to switch from the on-screen state to the bright screen state.

A person skilled in the art may understand that the structure shown in FIG. 11 constitutes no limitation to the terminal 1100, and the terminal 1100 may include more or fewer components than those shown in the figure, or some components may be combined, or a different component deployment may be used.

An embodiment of this application further provides a terminal configured to localize a camera, the terminal including a processor and a memory, the memory storing computer-readable instructions, and the computer-readable instructions, when being executed by the processor, causing the processor to perform the steps in the foregoing camera localization method. The steps of the camera localization method herein may be the steps of the camera localization method in the foregoing embodiments.

An embodiment of this application further provides a computer-readable storage medium, storing computer-readable instructions, and the computer-readable instructions, when being executed by the processor, causing a processor to perform the steps in the foregoing camera localization method. The steps of the camera localization method herein may be the steps of the camera localization method in the foregoing embodiments.

The computer-readable instruction may include a program, a code set, and the like.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory (ROM), a magnetic disk, an optical disc, or the like.

The foregoing descriptions are merely exemplary embodiments of this application, and are not intended to limit this application. Any modification, equivalent replacement, improvement and the like made within the spirit and principle of this application shall fall within the protection scope of this application.

What is claimed is:

1. A method for camera localization, performed by a terminal, the method comprising:
   obtaining a plurality of original images by photographing a target environment by a camera, determining a standard image according to the plurality of original images, and determining location information of the camera when shooting the standard image;
   matching, for any original image other than the standard image, a feature point in the original image with a feature point in the standard image to obtain a feature point correspondence, the feature point correspondence comprising a correspondence between the feature point in the original image and a matching feature point in the standard image; and obtaining location information of the camera when shooting the original image according to the feature point correspondence and the location information of the camera when shooting the standard image;
   obtaining, for a designated feature point in each of the plurality of original images, location information of the designated feature point according to the location information of the camera when shooting the each of the plurality of original images and a depth of the designated feature point in the each of the plurality of original images;
   performing plane estimation within a preset range of the designated feature point according to the location information of the designated feature point and location information of other points in the each of the plurality of original images, to determine at least one plane passing through the designated feature point;
   determining a first connected area and a second connected area obtained by dividing the target environment through the at least one plane, and determining an area in which the camera is located in the first connected area and the second connected area as a viewing-angle area in which the designated feature point is observable to obtain viewing-angle area information;
   building an environment map according to the location information of each of the feature points and the viewing-angle area information of each of the feature points in the plurality of original images;
   predicting a location of the camera when shooting a target image according to location information of the camera when shooting a history image which is shot before the target image to obtain predicted location information of the camera;

filtering out at least one feature point that is currently not observable by the camera in the environment map according to the location information of the each of the plurality of feature points and the viewing-angle area information of the each of the plurality of feature points in the environment map and the predicted location information of the camera; and matching a feature point in the target image with remaining feature points in the environment map after the filtering to obtain a feature point correspondence, and determining location information of the camera according to the feature point correspondence, the feature point correspondence comprising a correspondence between the feature point in the target image and a matching feature point in the environment map.

2. The method according to claim 1, wherein predicting the location of the camera comprises at least one of:

obtaining the predicted location information of the camera by using a constant speed model according to location information of the camera when shooting a last image and a time interval between any two images that are adjacent in time and shot by the camera, obtaining the predicted location information of the camera by using a variable speed model according to location information of the camera when shooting the last image, the time interval between any two images that are adjacent in time and shot by the camera, and an acceleration detected by a sensor, or obtaining location change information of the target image relative to the last image by tracking a feature point in the last image during a period from shooting the last image to shooting the target image by the camera, and obtaining the predicted location information of the camera according to location information of the camera when shooting the last image and the location change information of the target image relative to the last image.

3. The method according to claim 1, wherein the method further comprises:

matching the feature point in the target image with the plurality of feature points in the environment map to obtain the predicted location information of the camera if the camera is just started or initialized, or the predicted location information of the camera fails to be obtained according to the location information of the camera when shooting the history image.

4. The method according to claim 1, wherein filtering out the at least one feature point comprises:

filtering out each of the at least one feature point if it is determined that the camera is not located in a viewing-angle area of the each of the at least one feature point according to the predicted location information of the camera.

5. The method according to claim 1, wherein performing plane estimation comprises:

selecting at least three feature points within the preset range of the designated feature point, the designated feature point being located inside a polygon formed by the at least three feature points, the at least three feature points being located in a same plane but not located in a same line in the environment map; and determining that the designated feature point is located in the plane in which the at least three feature points are located if a distance between the designated feature point and the plane in which the at least three feature points are located is less than a preset distance.

6. The method according to claim 5, wherein performing plane estimation further comprises:

performing edge detection within the preset range if the distance between the designated feature point and the plane in which the at least three feature points are located is not less than the preset distance to obtain at least one edge line with the designated feature point as a vertex, and obtaining at least four feature points within the preset range; and using the designated feature point as an intersecting point of at least two planes, using the at least one edge line as an intersecting line of any two planes in the at least two planes, and using the at least four feature points as points in the at least two planes to obtain the at least two planes.

7. The method according to claim 1, wherein the camera is a depth camera, and performing plane estimation comprises:

obtaining depths of a plurality of points within the preset range of the designated feature point in the each of the plurality of original images, and determining the at least one plane according to the depth of each of the plurality of points in the each of the plurality of original images, the designated feature point being located in each plane in the at least one plane, each of the plurality of points within the preset range of the designated feature point being located in any one or two planes in the at least one plane.

8. An apparatus for camera localization, comprising a memory for storing computer readable instructions and a processor in communication with the memory, wherein the processor is configured to execute the computer readable instructions to cause the apparatus to:

obtain a plurality of original images by photographing a target environment by a camera, determine a standard image according to the plurality of original images, and determine location information of the camera when shooting the standard image;

match, for any original image other than the standard image, a feature point in the original image with a feature point in the standard image to obtain a feature point correspondence, the feature point correspondence comprising a correspondence between the feature point in the original image and a matching feature point in the standard image; and obtain location information of the camera when shooting the original image according to the feature point correspondence and the location information of the camera when shooting the standard image;

obtain, for a designated feature point in each of the plurality of original images, location information of the designated feature point according to the location information of the camera when shooting the each of the plurality of original images and a depth of the designated feature point in the each of the plurality of original images;

perform plane estimation within a preset range of the designated feature point according to the location information of the designated feature point and location information of other points in the each of the plurality of original images, to determine at least one plane passing through the designated feature point;

determine a first connected area and a second connected area obtained by dividing the target environment through the at least one plane, and determine an area in which the camera is located in the first connected area and the second connected area as a viewing-angle area in which the designated feature point is observable to obtain viewing-angle area information;

build an environment map according to the location information of each of the feature points and the viewing-angle area information of each of the feature points in the plurality of original images;

predict a location of the camera when shooting a target image according to location information of the camera when shooting a history image which is shot before the target image to obtain predicted location information of the camera;

filter out at least one feature point that is currently not observable by the camera in the environment map according to the location information of the each of the plurality of feature points and the viewing-angle area information of the each of the plurality of feature points in the environment map and the predicted location information of the camera; and match a feature point in the target image with remaining feature points in the environment map after the filtering to obtain a feature point correspondence, and determine location information of the camera according to the feature point correspondence, the feature point correspondence comprising a correspondence between the feature point in the target image and a matching feature point in the environment map.

9. The apparatus according to claim 8, wherein the processor, when executing the computer readable instructions to cause the apparatus to predict the location of the camera, is configured to cause the apparatus to perform at least one of:

obtaining the predicted location information of the camera by using a constant speed model according to location information of the camera when shooting a last image and a time interval between any two images that are adjacent in time and shot by the camera, obtaining the predicted location information of the camera by using a variable speed model according to location information of the camera when shooting the last image, the time interval between any two images that are adjacent in time and shot by the camera, and an acceleration detected by a sensor, or obtaining location change information of the target image relative to the last image by tracking a feature point in the last image during a period from shooting the last image to shooting the target image by the camera, and obtaining the predicted location information of the camera according to location information of the camera when shooting the last image and the location change information of the target image relative to the last image.

10. The apparatus according to claim 8, wherein the processor, when executing the computer readable instructions, is further configured to cause the apparatus to:

match the feature point in the target image with the plurality of feature points in the environment map to obtain the predicted location information of the camera if the camera is just started or initialized, or the predicted location information of the camera fails to be obtained according to the location information of the camera when shooting the history image.

11. The apparatus according to claim 8, wherein the processor, when executing the computer readable instructions to cause the apparatus to filter out the at least one feature point, is configured to cause the apparatus to:

filter out each of the at least one feature point if it is determined that the camera is not located in a viewing-angle area of the each of the at least one feature point according to the predicted location information of the camera.

12. The apparatus according to claim 8, wherein the processor, when executing the computer readable instructions to cause the apparatus to perform plane estimation, is configured to cause the apparatus to:

select at least three feature points within the preset range of the designated feature point, the designated feature point being located inside a polygon formed by the at least three feature points, the at least three feature points being located in a same plane but not located in a same line in the environment map; and determine that the designated feature point is located in the plane in which the at least three feature points are located if a distance between the designated feature point and the plane in which the at least three feature points are located is less than a preset distance.

13. The apparatus according to claim 12, wherein the processor, when executing the computer readable instructions to cause the apparatus to perform plane estimation, is further configured to cause the apparatus to:

perform edge detection within the preset range if the distance between the designated feature point and the plane in which the at least three feature points are located is not less than the preset distance to obtain at least one edge line with the designated feature point as a vertex, and obtain at least four feature points within the preset range; and use the designated feature point as an intersecting point of at least two planes, use the at least one edge line as an intersecting line of any two planes in the at least two planes, and use the at least four feature points as points in the at least two planes to obtain the at least two planes.

14. The apparatus according to claim 8, wherein the camera is a depth camera, and wherein the processor, when executing the computer readable instructions to cause the apparatus to perform plane estimation, is configured to cause the apparatus to:

obtain depths of a plurality of points within the preset range of the designated feature point in the each of the plurality of original images, and determine the at least one plane according to the depth of each of the plurality of points in the each of the plurality of original images, the designated feature point being located in each plane in the at least one plane, each of the plurality of points within the preset range of the designated feature point being located in any one or two planes in the at least one plane.

15. A non-transitory storage medium for storing computer readable instructions, the computer readable instructions, when executed by one or more processors, causing the one or more processors to:

obtain a plurality of original images by photographing a target environment by a camera, determine a standard image according to the plurality of original images, and determine location information of the camera when shooting the standard image;

match, for any original image other than the standard image, a feature point in the original image with a feature point in the standard image to obtain a feature point correspondence, the feature point correspondence comprising a correspondence between the feature point in the original image and a matching feature point in the standard image; and obtain location information of the camera when shooting the original image according to the feature point correspondence and the location information of the camera when shooting the standard image;

obtain, for a designated feature point in each of the plurality of original images, location information of the designated feature point according to the location information of the camera when shooting the each of the plurality of original images and a depth of the designated feature point in the each of the plurality of original images;

perform plane estimation within a preset range of the designated feature point according to the location information of the designated feature point and location information of other points in the each of the plurality of original images, to determine at least one plane passing through the designated feature point;

determine a first connected area and a second connected area obtained by dividing the target environment through the at least one plane, and determine an area in which the camera is located in the first connected area and the second connected area as a viewing-angle area in which the designated feature point is observable to obtain viewing-angle area information;

build an environment map according to the location information of each of the feature points and the viewing-angle area information of each of the feature points in the plurality of original images;

predict a location of the camera when shooting a target image according to location information of the camera when shooting a history image which is shot before the target image to obtain predicted location information of the camera;

filter out a feature point that is currently not observable by the camera in the environment map according to the location information of the each of the plurality of feature points and the viewing-angle area information of the each of the plurality of feature points in the environment map and the predicted location information of the camera; and match a feature point in the target image with remaining feature points in the environment map after the filtering to obtain a feature point correspondence, and determine location information of the camera according to the feature point correspondence, the feature point correspondence comprising a correspondence between the feature point in the target image and a matching feature point in the environment map.

16. The non-transitory storage medium according to claim 15, wherein the computer readable instructions, when executed by one or more processors, further causing the one or more processors to:

match the feature point in the target image with the plurality of feature points in the environment map to obtain the predicted location information of the camera if the camera is just started or initialized, or the predicted location information of the camera fails to be obtained according to the location information of the camera when shooting the history image.

* * * * *